United States Patent
Kawasaki et al.

(10) Patent No.: US 9,230,144 B2
(45) Date of Patent: Jan. 5, 2016

(54) COMMUNICATION DEVICE AND WORKING VEHICLE PROVIDED WITH THE SAME

(71) Applicant: Komatsu Ltd., Minato-ku, Tokyo (JP)

(72) Inventors: Shinpei Kawasaki, Hiratsuka (JP); Motoi Ishidou, Hiratsuka (JP); Yasushi Tsushimi, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/345,534

(22) PCT Filed: Sep. 19, 2013

(86) PCT No.: PCT/JP2013/075317
§ 371 (c)(1),
(2) Date: Mar. 18, 2014

(87) PCT Pub. No.: WO2015/040716
PCT Pub. Date: Mar. 26, 2015

(65) Prior Publication Data
US 2015/0081177 A1 Mar. 19, 2015

(51) Int. Cl.
*G06K 7/10* (2006.01)
*E02F 9/26* (2006.01)
*G07C 5/00* (2006.01)
*E02F 9/08* (2006.01)

(52) U.S. Cl.
CPC ........ *G06K 7/10158* (2013.01); *G06K 7/10009* (2013.01); *E02F 9/0866* (2013.01); *E02F 9/267* (2013.01); *G07C 5/006* (2013.01); *G07C 5/008* (2013.01)

(58) Field of Classification Search
CPC ..... B60K 7/10465; E02F 9/267; G07C 5/006; G07C 5/008
See application file for complete search history.

(56) References Cited

U.S. PATENT DOCUMENTS 5,526,528 A 6/1996 Kurisu
6,907,384 B2 * 6/2005 Adachi et al. ................. 702/184
(Continued)

FOREIGN PATENT DOCUMENTS

JP H07-212257 A 8/1995
JP 7-331986 * 12/1995
(Continued)

OTHER PUBLICATIONS

International Search Report dated Dec. 17, 2013 from International Application No. PCT/JP2013/075317, 4 pages.
Office Action issued Oct. 1, 2014 in corresponding Japanese Patent Application No. 2014-509558, 4 pages.

*Primary Examiner* — Michael J Zanelli
(74) *Attorney, Agent, or Firm* — Fish & Richardson P.C.

(57) ABSTRACT

A reader writer (a communication device) executes at least one of reading identification information of an IC tag (an identification component) and writing the identification information to the IC tag. The reader writer includes a CPU board (a control board) that includes CPU (a controller) and a wireless control circuit to output radio waves by a command from the CPU, an antenna that is spaced from the CPU board, and a connection cable that electrically connects the CPU board to the antenna. The CPU board includes a disconnection detector that detects a disconnection of the connection cable, and a transmission controller that interrupts an output from the wireless control circuit to the antenna when the disconnection detector judges that the connection cable is disconnected.

19 Claims, 13 Drawing Sheets

(56) References Cited

U.S. PATENT DOCUMENTS

| | | |
|---|---|---|
| 7,042,346 B2 * | 5/2006 | Paulsen .................. 340/438 |
| 8,311,698 B2 * | 11/2012 | Boss et al. .............. 701/29.6 |
| 2003/0022687 A1 | 1/2003 | Iida et al. |
| 2008/0318540 A1 | 12/2008 | Homan et al. |
| 2010/0013594 A1 * | 1/2010 | Komine et al. ............ 340/5.8 |
| 2011/0063078 A1 * | 3/2011 | Souma .................. 340/10.1 |
| 2011/0241854 A1 * | 10/2011 | Matsui et al. ........... 340/426.1 |
| 2012/0215418 A1 * | 8/2012 | Komine et al. ............ 701/101 |
| 2013/0049765 A1 * | 2/2013 | Cheung et al. ............ 324/538 |

FOREIGN PATENT DOCUMENTS

| | | | |
|---|---|---|---|
| JP | 11-337609 | * | 12/1999 |
| JP | 2002-203066 | * | 7/2002 |
| JP | 2002-331686 A | | 11/2002 |
| JP | 2003037509 A | | 2/2003 |
| JP | 2005-273196 A | | 10/2005 |
| JP | 2007-124142 A | | 5/2007 |
| JP | 2010-103598 A | | 5/2010 |

* cited by examiner

COMMUNICATION DEVICE AND WORKING VEHICLE PROVIDED WITH THE SAME

CROSS-REFERENCE TO RELATED APPLICATIONS

This application claims priority to International Application No. PCT/JP2013/075317 filed on Sep. 19, 2013, the contents of which are incorporated herein by reference in their entirety. The application also relates to International Application No. PCT/JP2013/075327 filed Sep. 19, 2013.

TECHNICAL FIELD

The present invention relates to a communication device such as a non-contact type reader, a writer or a reader writer, and a working vehicle (e.g., a construction machine) provided with the communication device.

BACKGROUND ART

A fuel filter and an oil filter mounted in a construction machine are consumable supplies (also referred to as a replacement component or a refill component) which are replaced every predetermined operating hours.

In order to detect replacement of a filter set in an engine room and a pump room of the construction machine, an IC (Integrated Circuit) tag is attached to the filter. The replacement of the filter is detectable by reading information (hereinafter, referred to as identification information) stored in the IC tag with use of a reader writer. When the reader writer is set in the engine room and the pump room, the reader writer can even constantly read the identification information. The reader writer transmits radio waves to the IC tag. The IC tag receiving the radio waves is activated to transmit the identification information stored therein toward the reader writer through the radio waves. Further, a component management system, in which the identification information is transmitted via wireless communication to a remote area using a wireless communication device and the like installed in the construction machine, has been proposed. Such a reader writer is required to have reliability of stable operation without breakdown or the like.

Patent Literature 1 discloses a replacement-component identifying device of a construction machine, which can easily identifying a genuine component and an imitation component among replacement components for use in the construction machine, and issue a warning or a command to stop the operation of the construction machine when the imitation component is identified.

CITATION LIST

Patent Literature

Patent Literature 1 JP-A-2005-273196

SUMMARY OF THE INVENTION

Problems to be Solved by the Invention

An unstable output of radio waves, which is caused by disconnection in a transmitter between a CPU board and an antenna of the reader writer, should be avoided. In other words, the unstable output of the radio waves may disturb stable reading and writing of the identification information from/to the IC tag.

An object of the invention is to provide a communication device capable of preventing breakage of an element or the like and an unstable output of radio waves, and a working vehicle provided with the communication device.

Means for Solving the Problems

According to an aspect of the invention, in a communication device mounted in a working vehicle and executing at least one of reading identification information stored in an identification component attached to a component of the working vehicle and writing the identification information to the identification component, the communication device includes: a control board including: a communication controller that controls an execution of the at least one of reading and writing the identification information; and a wireless control circuit that generates output of radio waves in response to a command from the communication controller; an antenna that is spaced from the control board and transmits the output obtained from the wireless control circuit; and a connection cable that electrically connects the control board to the antenna, in which the control board includes: a disconnection detector that detects a disconnection of the connection cable; and a transmission controller that interrupts the output from the wireless control circuit to the antenna when the disconnection detector judges that the connection cable is disconnected.

According to the above aspect of the invention, when the disconnection detector detects the disconnection of the connection cable (including an unplugged state of the connection cable from a connector or the like), the transmission controller interrupts the output from the wireless control circuit to the antenna. Accordingly, the output does not cause a total reflection on a disconnection part, so that damage to the element and the like can be prevented. Moreover, transmission of unstable radio waves is avoided by interrupting the output.

In the communication device according to the above aspect of the invention, preferably, the control board includes: a main power supply; a wireless power supply that generates power for the wireless control circuit from power supplied by the main power supply; and a wireless power supply controller that switches between a supply and an interruption of the power from the main power supply to the wireless power supply, and the transmission controller includes: the wireless power supply controller; and a switch command generator that generates a switch command of interrupting the supply of the power from the main power supply to the wireless power supply and transmits the switch command to the wireless power supply controller, when the disconnection detector judges that the connection cable is disconnected.

With this arrangement, since the wireless control circuit is kept not activated by interrupting the power supplied from the main power supply to the wireless power supply, no output to the antenna is generated, so that the total reflection of the output and transmission of unstable radio waves can be reliably prevented.

In the communication device according to the above aspect of the invention, the communication controller may be connected to the wireless control circuit via a transmission line, control communication of the identification information with the wireless control circuit, and decrease a voltage level of the transmission line when the disconnection detector judges that the connection cable is disconnected, alternatively, the communication controller may be connected to the wireless control circuit via a transmission line and controls communication of the identification information with the wireless control circuit, and the transmission line may include a relay that electrically interrupts the transmission line when the disconnection detector judges that the connection cable is disconnected.

With this arrangement, when the disconnection detector judges that the connection cable is disconnected, the communication controller decreases the voltage of the transmission line to a low level or interrupts the transmission line by the relay provided in the transmission line. Accordingly, sneak current from the communication controller to the wireless control circuit can be suppressed, thereby preventing the wireless control circuit from being activated by such a sneak current.

In the communication device according to the above aspect of the invention, preferably, the control board includes a pull-up resistor connected to a transmission line between the control board and the antenna including the connection cable, the antenna includes a pull-down resistor that connects the transmission line to a ground line, and the disconnection detector detects a voltage of the transmission line on the control board.

With this arrangement, comparison between the detection voltage to be detected and the set voltage to be calculated with the pull-up resistor and the pull-down resistor is only required. Accordingly, the disconnection can be easily judged with a simple circuit structure.

In the communication device according to the above aspect of the invention, preferably, the disconnection detector detects the disconnection when the communication controller is activated by receiving power from a battery of the working vehicle.

With this arrangement, since the disconnection is judged immediately when the communication controller is activated, the total reflection and transmission of unstable radio waves can be suppressed.

In the communication device according to the above aspect of the invention, preferably, the disconnection detector detects, as the disconnection, breakage of the connection cable or an unplugged state of the connection cable from a connector connected to the control board or the antenna.

According to another aspect of the invention, in a communication device mounted in a working vehicle and executing at least one of reading identification information stored in an identification component attached to a component of the working vehicle and writing the identification information to the identification component, the communication device includes: a control board including: a communication controller that controls an execution of the at least one of reading and writing the identification information; and a wireless control circuit that generates output of radio waves in response to a command from the communication controller; an antenna that is spaced from the control board and transmits the output obtained from the wireless control circuit; and a connection cable that electrically connects the control board to the antenna, in which a disconnection detector that detects a disconnection of the connection cable; a transmission controller that interrupt the output from the wireless control circuit to the antenna when the disconnection detector judges that the connection cable is disconnected; a main power supply; a wireless power supply that generates power for the wireless control circuit from power supplied from the main power supply; a wireless power supply controller that switches between a supply and an interruption of the power from the main power supply to the wireless power supply; and a pull-up resistor connected to a transmission line between the control board and the antenna including the connection cable, the transmission controller includes: the wireless power supply controller; and a switch command generator that generates a switch command of interrupting the supply of the power from the main power supply to the wireless power supply and transmits the switch command to the wireless power supply controller, when the disconnection detector judges that the connection cable is disconnected, the antenna comprises a pull-down resistor that connects the transmission line to a ground line, and the disconnection detector detects a voltage of the transmission line on the control board.

The working vehicle according to the above aspect of the invention includes the communication device according to one of the above arrangements. The working vehicle provides the same advantageous effects as the communication device.

DESCRIPTION OF EMBODIMENT(S)

Exemplary embodiment(s) of the invention will be described below with reference to the attached drawings.

Figure 1:
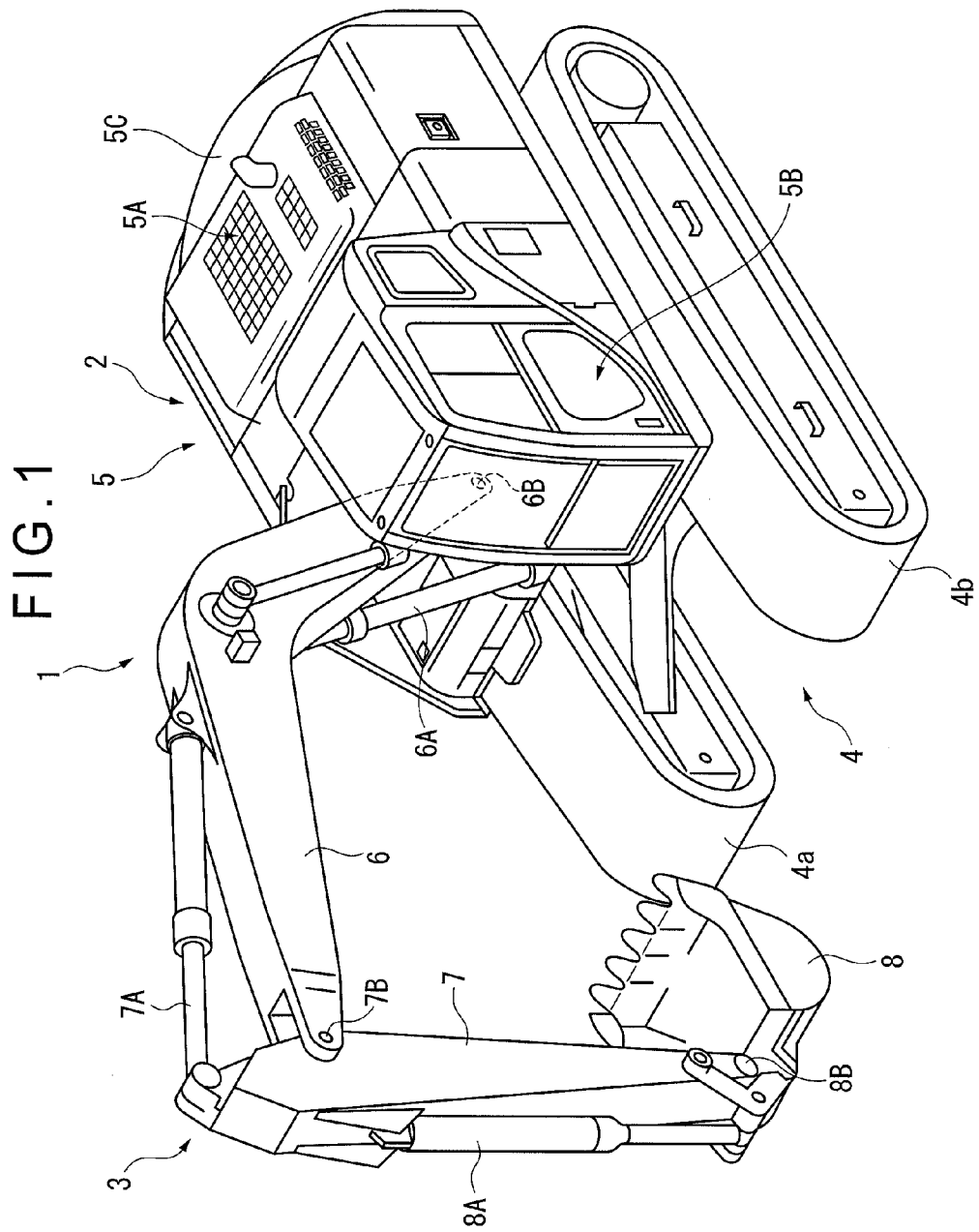
FIG. 1 is a perspective view showing a working vehicle according to an exemplary embodiment of the invention.

FIG. 1 is a perspective view of a hydraulic excavator 1 (a construction machine) as one of working vehicles in which a reader writer 15 (a communication device) in the exemplary embodiment of the invention is mounted. In the exemplary embodiment, the hydraulic excavator 1 includes a vehicle body 2 and working equipment 3. The vehicle body 2 includes a travelling device 4 and an upper revolving body 5. The upper revolving body 5 includes a machine room 5A that houses a motive power generator (e.g., an engine EG), a hydraulic pump 12 and the like. The machine room 5A is disposed near an end of the upper revolving body 5.

In the exemplary embodiment, the hydraulic excavator 1 includes an internal combustion engine (e.g., a diesel engine) as the motive power generator. However, the arrangement of the hydraulic excavator 1 is not limited thereto. For instance, the hydraulic excavator 1 may be provided with a so-called hybrid motive power generator in which an internal combustion engine, a generator and a capacitor are combined.

The working equipment 3 and a cab 5B are provided in the front of the upper revolving body 5 while the machine room 5A is provided at the back of the upper revolving body 5. The upper revolving body 5 includes the cab 5B. The upper revolving body 5 further includes a counterweight 5C. The cab 5B is mounted on the upper revolving body 5. The cab 5B is disposed in front of the machine room 5A. The counterweight 5C is disposed behind the machine room 5A.

The counterweight 5C, which is provided for weight balance with the working equipment 3, is filled with heavy weights.

The travelling device 4 includes crawlers 4a and 4b. The travelling device 4 drives a hydraulic motor (not shown), thereby rotating the crawlers 4a and 4b to travel, thereby driving the hydraulic excavator 1. The working equipment 3 is attached to a lateral side of the cab 5B of the upper revolving body 5.

As described above, the working equipment 3 and the cab 5B are provided in the front of the upper revolving body 5 while the machine room 5A is provided at the back of the upper revolving body 5. The left and right sides of the upper revolving body 5 are determined with reference to the upper revolving body 5 facing forward.

The working equipment 3 includes a boom 6, atm 7, bucket 8, boom cylinder 6A, arm cylinder 7A and bucket cylinder 8A. A base end portion of the boom 6 is attached to the front of the vehicle body 2 through a boom pin 6B, whereby the boom 6 is swingable. A base end portion of the arm 7 is attached to a tip end of the boom 6 through an arm pin 7B, whereby the arm 7 is swingable. The bucket 8 is attached to a tip end of the arm 7 through a bucket pin 8B, whereby the bucket 8 is swingable.

Figure 13:
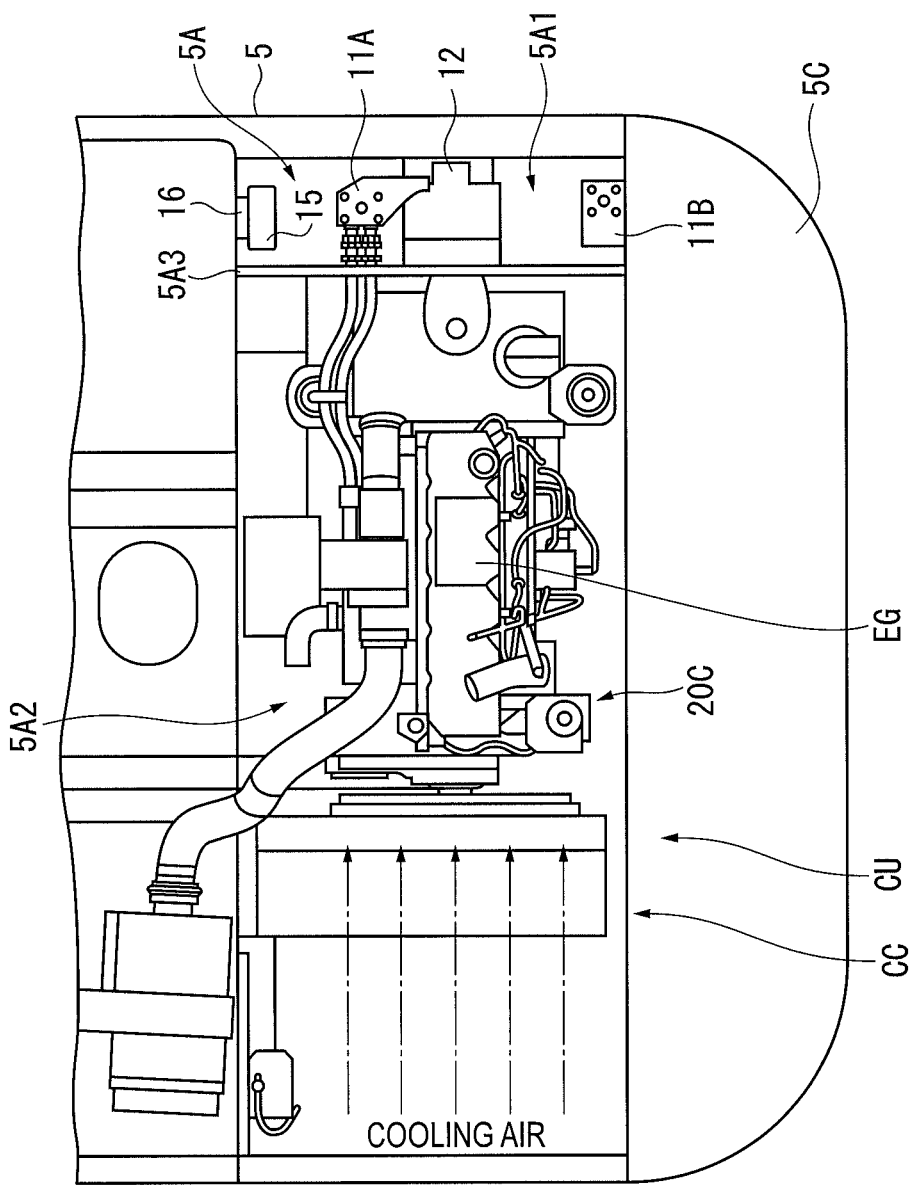
FIG. 13 is a top view showing an inside of the machine room.

FIG. 13 is a top view showing an inside of the machine room 5A. The machine room 5A houses the engine EG and the hydraulic pump 12. The machine room 5A is disposed near an end (rear side) of the upper revolving body 5. The inside of the machine room 5A is divided into a pump room 5A1 and an engine room 5A2 by a partition board 5A3. When the machine room 5A is seen from the back, the pump room 5A1 is positioned on the right side of the machine room 5A while the engine room 5A2 is positioned on the left side thereof. The partition board 5A3 is a metal plate for preventing the hydraulic oil from splashing on hot parts of the engine EG. The engine room 5A2 houses a cooling unit CU including a cooling core CC and the like, in addition to the engine EG. The machine room 5A is separated from the front side beyond the machine room 5A by a partition plate (not shown). The cooling unit CU is adjacent to the engine EG and cools a cooling water, hydraulic oil and the like flowing into the engine EG.

Figure 2:
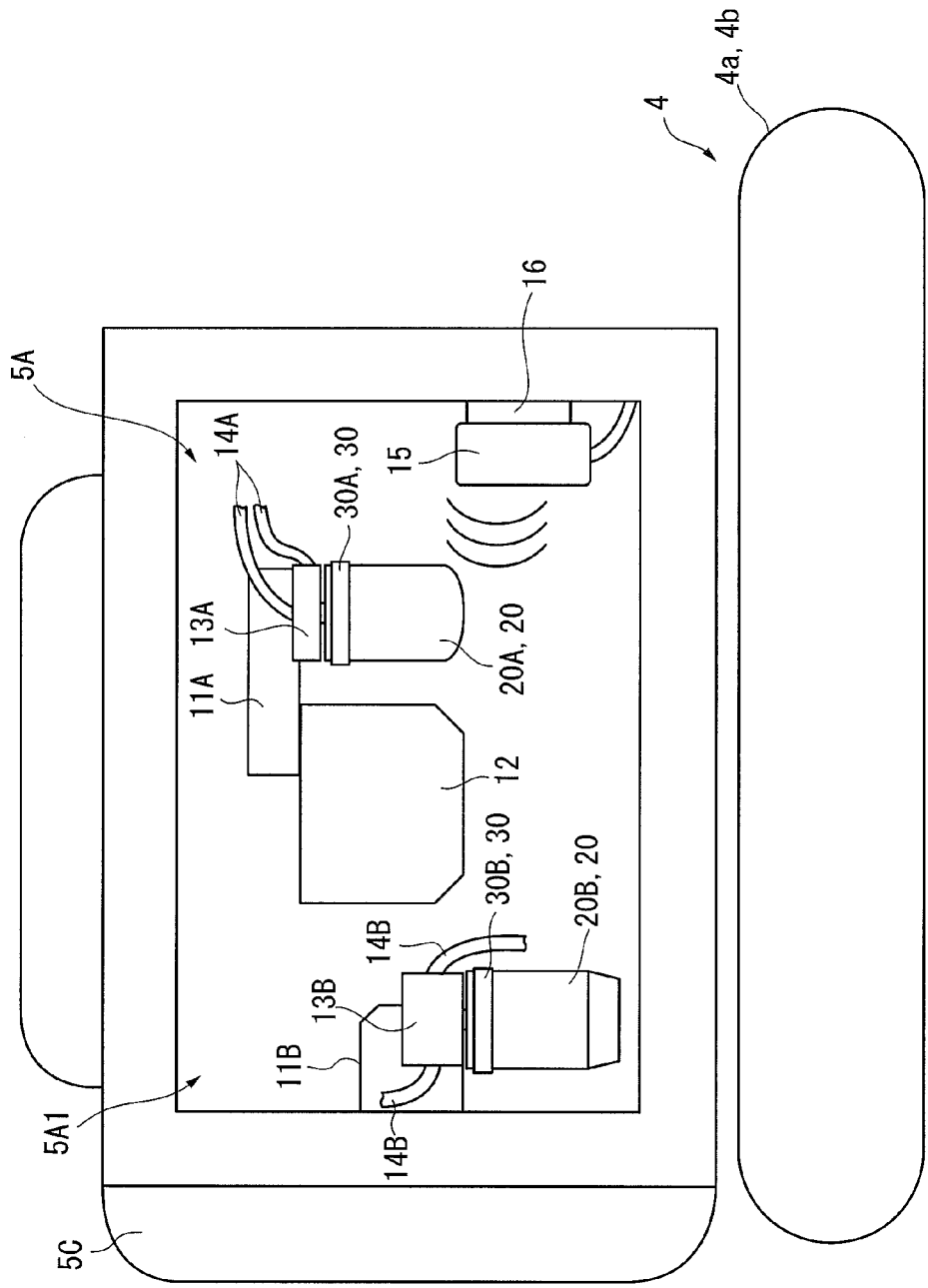
FIG. 2 is a schematic view showing a filter provided with an IC tag and a communication device which are disposed in a machine room of the working vehicle.

FIG. 2 shows the pump room 5A1 with a door (not shown), which is positioned on the right side of the machine room 5A of the hydraulic excavator 1, being opened. For example, a bracket 11A attached to the hydraulic pump 12 is provided in the pump room 5A1 of the machine room 5A. The bracket 11A is attached with a filter head 13A. The filter head 13A is attached with a hose 14A.

The filter head 13A is attached with a filter 20A. The filter 20A is an engine oil filter. Dust and the like contained in the oil flowing through the hose 14A are removed by the filter 20A.

The pump room 5A1 of the machine room 5A is attached with a filter head 13B through a bracket 11B. The filter head 13B is attached with a fuel hose 14B.

The filter head 13B is attached with a filter 20B. The filter is a fuel pre-filter. Dust and the like contained in the fuel flowing through the fuel hose 14B are removed by the filter 20B.

The filter heads 13A and 13B each are a filter-holding component for holding and fixing the filter 20. Hereinafter, the filter heads 13A and 13B and a filter head (not shown) for holding and fixing a fuel main filter 20C may be collectively referred to as a filter head 13. The fuel main filter 20C is disposed in the engine room 5A2 as shown in FIG. 13, although not shown in FIG. 2. As described above and shown in FIG. 2, the filter 20A and the filter 20B are disposed in the pump room 5A1 using the hose 14A and the fuel hose 14B in a position where a service engineer can inspect and replace the filter 20 at hand.

An engine room 5A2 (FIG. 13) is positioned on an opposite side from the pump room 5A1 (i.e., the left side of the hydraulic excavator 1). As shown in FIG. 13, the fuel main filter 20C is provided near the engine EG in the engine room 5A2 of the machine room 5A, using a filter head (not shown). The fuel main filter 20C also removes dust and the like contained in the fuel. The fuel flows from a fuel tank (not shown) to the fuel pre-filter 20B and further to the fuel main filter 20C to be supplied to a fuel injector (not shown). Each of the filters 20A, 20B and 20C described above is a component that requires a periodic replacement because an internal filter member is clogged in use. Timing for the periodic replacement can be judged, for instance, from accumulated operating hours shown on a service meter that measures operating hours of the engine EG of the hydraulic excavator 1. In the exemplary embodiment, the hydraulic excavator 1 including the fuel pre-filter 20B is shown. However, the hydraulic excavator 1 without the fuel pre-filter 20B or the hydraulic excavator 1 with a plurality of fuel pre-filters 20B is also usable.

Figure 3:
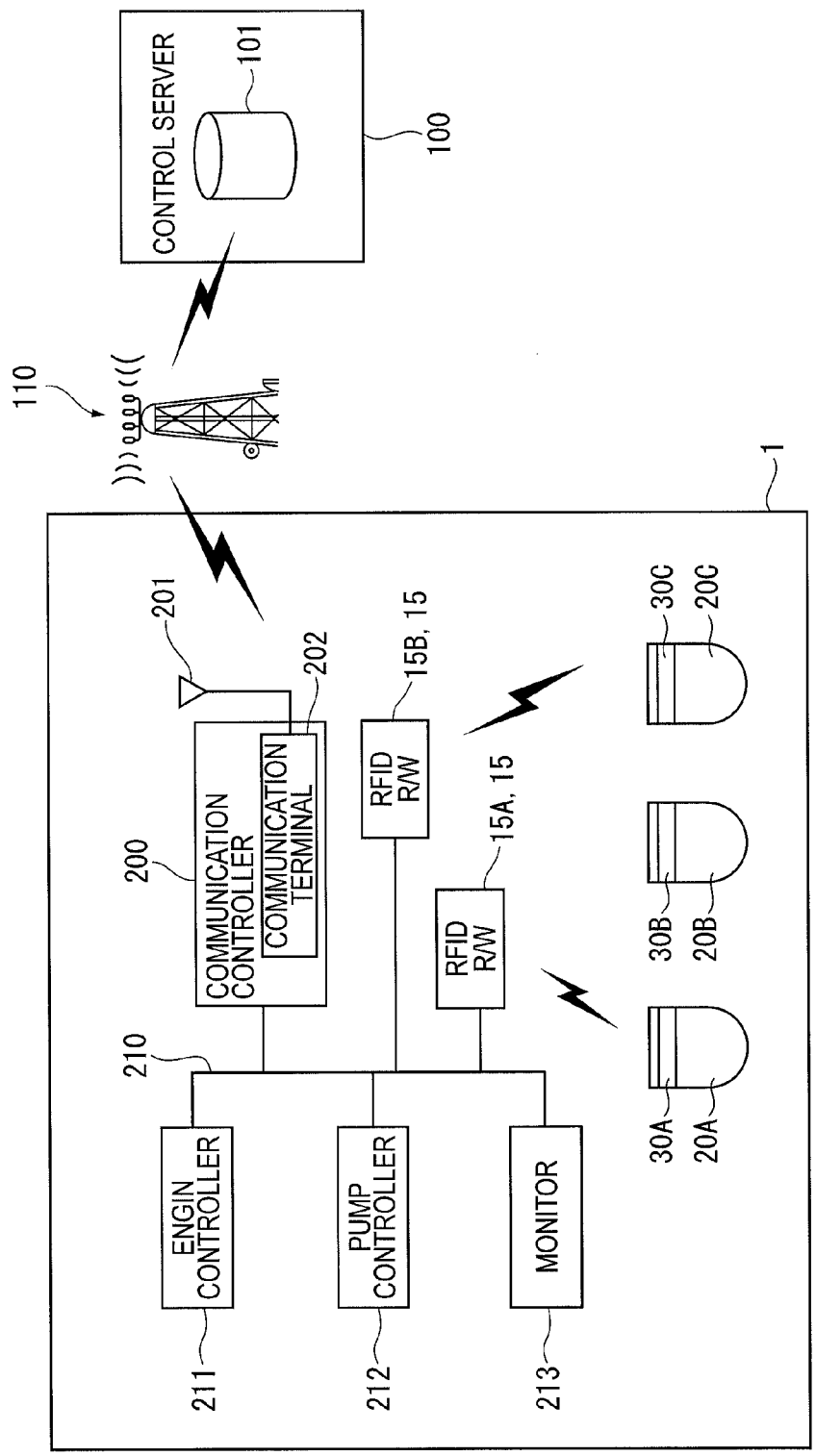
FIG. 3 is a block diagram schematically showing an arrangement of a component management system.

FIG. 3 is a block diagram schematically showing an arrangement of a component management system. In FIG. 3, the filters 20A, 20B and 20C are respectively attached with IC tags 30A, 30B and 30C (i.e., an identification component) that store the identification information for the respective filters 20. The identification information such as an item number for specifying a type of a component, a manufacturing date of the component, a serial number (manufacturing number) for specifying each of components having the same item number, a supplier code of a manufacturer of the components, and the like are stored in the IC tags 30A, 30B and 30C.

In the machine room 5A, the reader writer 15 that reads the identification information stored in the IC tags 30A, 30B and 30C is attached via a bracket 16. In the exemplary embodiment, the reader writer 15 is used for explanation. However, the invention is not limited to the reader writer 15 capable of executing both reading and writing of the identification information, but also applicable to a reader capable of executing a function of only reading the identification information of the IC tags 30A, 30B and 30C, as the communication device. Further, the invention is applicable to a writer capable of executing a function of only writing information on the IC tags 30A, 30B and 30C, as the communication device.

Component Monitoring System of Working Vehicle

Next, a component monitoring system with use of the identification information stored in the IC tags 30A, 30B and 30C of the respective filters 20A, 20B and 20C will be described with reference to FIG. 3.

The component monitoring system includes a control center 100, the hydraulic excavator 1, and a communication network 110 through which the identification information is transmitted and received between the control center 100 and a plurality of hydraulic excavators 1.

The control center 100 controls a variety of information including identification information of a plurality of working vehicles, in a unified manner. In other words, the control center 100 acquires and controls not only the identification information but also a variety of information such as information of the accumulated operating hours and failure information of each of the working vehicles, through a wireless communication from each of the working vehicles. A control server 101 of the control center 100 controls and stores the identification information of the hydraulic excavator 1.

The communication network 110 is a network for data communication through a wireless communication, with use of a mobile phone network and/or a satellite communication network.

The hydraulic excavator 1 (working vehicle) is provided with a communication controller 200 having a communication terminal 202 that is connected to an antenna 201 for communication through the communication network. Moreover, the hydraulic excavator 1 includes an engine controller 211, a pump controller 212, a monitor 213, and the reader writer 15. The engine controller 211 controls a fuel amount to be injected from a fuel injector (not shown) to the engine EG to adjust engine output. The pump controller 212 controls an angle of a swash plate of the hydraulic pump 12 or a hydraulic motor (not shown) to adjust a discharge amount of the hydraulic oil. The monitor 213 has functions to display a residual amount of the fuel and set operation conditions of the hydraulic excavator 1. In the exemplary embodiment, two reader writers 15A and 15B are provided as the reader writer 15. The reader writer 15 may be provided by a single reader writer or by two or more reader writers. A communication state between the reader writer 15 and each of the IC tags 30A, 30B and 30C is determined depending on relative positions therebetween. Accordingly, with a plurality of reader writers 15, the identification information of the IC tag can be reliably read, or the identification information can be read from the plural IC tags. These devices and the communication controller 200 are connected in a manner capable of mutual data communication through an in-vehicle network 210 such as CAN (Controller Area Network).

As shown in FIG. 2, the reader writer 15A is provided in the pump room 5A1, while the reader writer 15B is provided in the engine room 5A2. In the exemplary embodiment, each of the reader writers 15A and 15B can communicate with the IC tags 30A, 30B and 30C of the respective filters 20A, 20B and 20C. In the following description, the IC tags 30A, 30B and 30C may be collectively referred to as an IC tag 30. The reader writers 15 and 15B may be collectively referred to as the reader writer 15.

When an operator operates a key switch (not shown) to start the engine EG of the hydraulic excavator 1, the reader writer 15 is powered from a battery (not shown) to operate.

Figure 9:
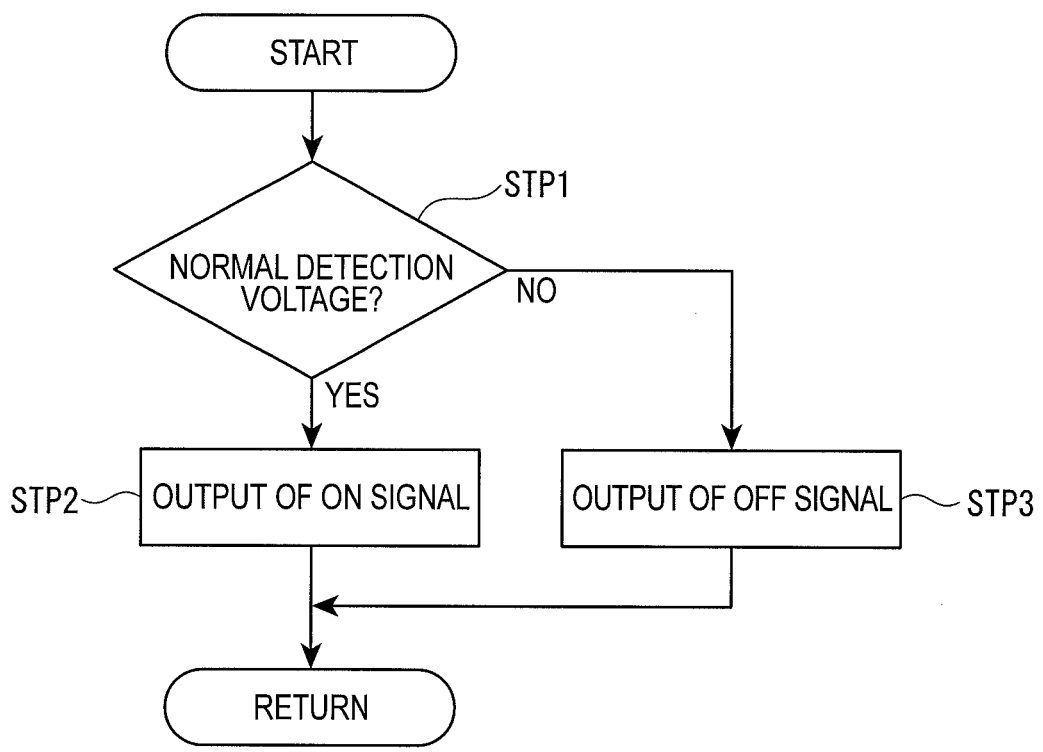
FIG. 9 is a flowchart of disconnection detection.
Figure 10:
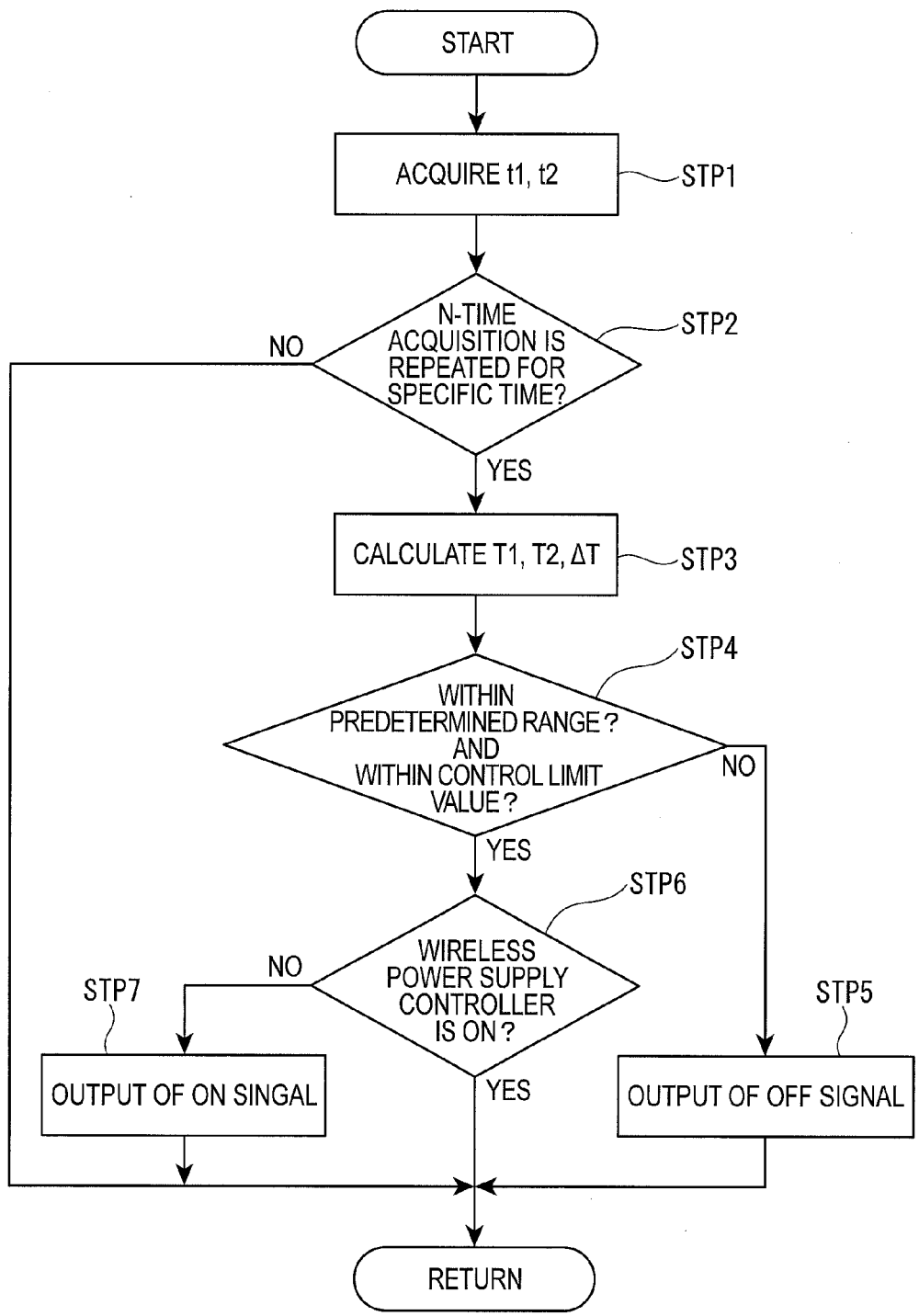
FIG. 10 is a flowchart of temperature detection.

Alternatively, the communication controller 200 may have a timer function to operate the reader writer 15 periodically (e.g., once a day), or the reader writer 15 may be non-periodically operated in accordance with an operational instruction of an administrator in the control center 100 or an operator of the hydraulic excavator 1. Specifically, the reader writer 15 may be adapted to be driven when the communication controller 200 receives a predetermined driving signal that the administrator transmits from the control center 100 to the hydraulic excavator 1 through the communication network 110. Alternatively, the reader writer 15 may be adapted to be driven when the communication controller 200 receives a predetermined driving signal that the operator of the hydraulic excavator 1 transmits by operating an operational button. Further, a sensor that detects attachment/detachment of the filter 20 may be provided to the filter head 13. The reader writer 15 may be operated in response to output of this sensor. When the reader writer 15 is driven due to the above various driving factors, power is supplied from a battery (not shown) to the reader writer 15, thereby executing a flow of interrupting the power according to the detection of disconnection as shown in FIG. 9, or a flow of interrupting the power according to the detection of temperatures as shown in FIG. 10.

The communication controller 200 reads the identification information of the IC tag 30 through the reader writer 15, writes new identification information to the IC tag 30, or updates old identification information.

The communication controller 200 transmits the identification information read from the IC tag 30 to the control server 101 of the control center 100 through the communication terminal 202, antenna 201, and communication network 110. The aforementioned function of the communication controller 200 may be provided to another controller such as the pump controller 212.

With the above component monitoring system, in an area remote from the hydraulic excavator 1 (working vehicle), the control server 101 can recognize attachment timing of the filters 20A, 20B and 20C by acquiring the identification information of the IC tags 30A, 30B and 30C read by the reader writer 15. Accordingly, the control server 101 can easily and reliably manage a replacement timing of each of the filters 20A, 20B and 20C in the working vehicle. Moreover, the control server 101 can notify the replacement timing of each of the filters 20A, 20B and 20C to a maintenance engineer of the working vehicle. Accordingly, the maintenance engineer can reliably replace filters of a working vehicle of a customer at an appropriate timing.

It is crucial in terms of the aforementioned component management to thus reliably acquire the identification information of the IC tag 30 using the reader writer 15.

Arrangement of Machine Room

Next, the filter 20 (20A, 20B, 20C) will be described.

As described above or as shown in FIGS. 2 and 3, the machine room 5A is attached with the filters provided with the IC tags (hereinafter abbreviated as a filter) 20 such as the oil filter 20A, the fuel pre-filter 20B, and the fuel main filter 20C.

Moreover, the machine room 5A is provided with the reader writer 15 (15A,15B) that reads the identification information of the IC tag 30 attached to the filter 20.

Reader Writer

The reader writer 15 according to the exemplary embodiment communicates with the IC tag 3 using radio waves in, for instance, a UHF band of 900 MHz. With the radio waves in this frequency band, the reader writer 15 can communicate with the IC tags 30 distanced by about 1 m. Accordingly, the reader writer 15 is usable even in the engine room 5A2 and the pump room 5A1 of the hydraulic excavator 1.

Figure 4:
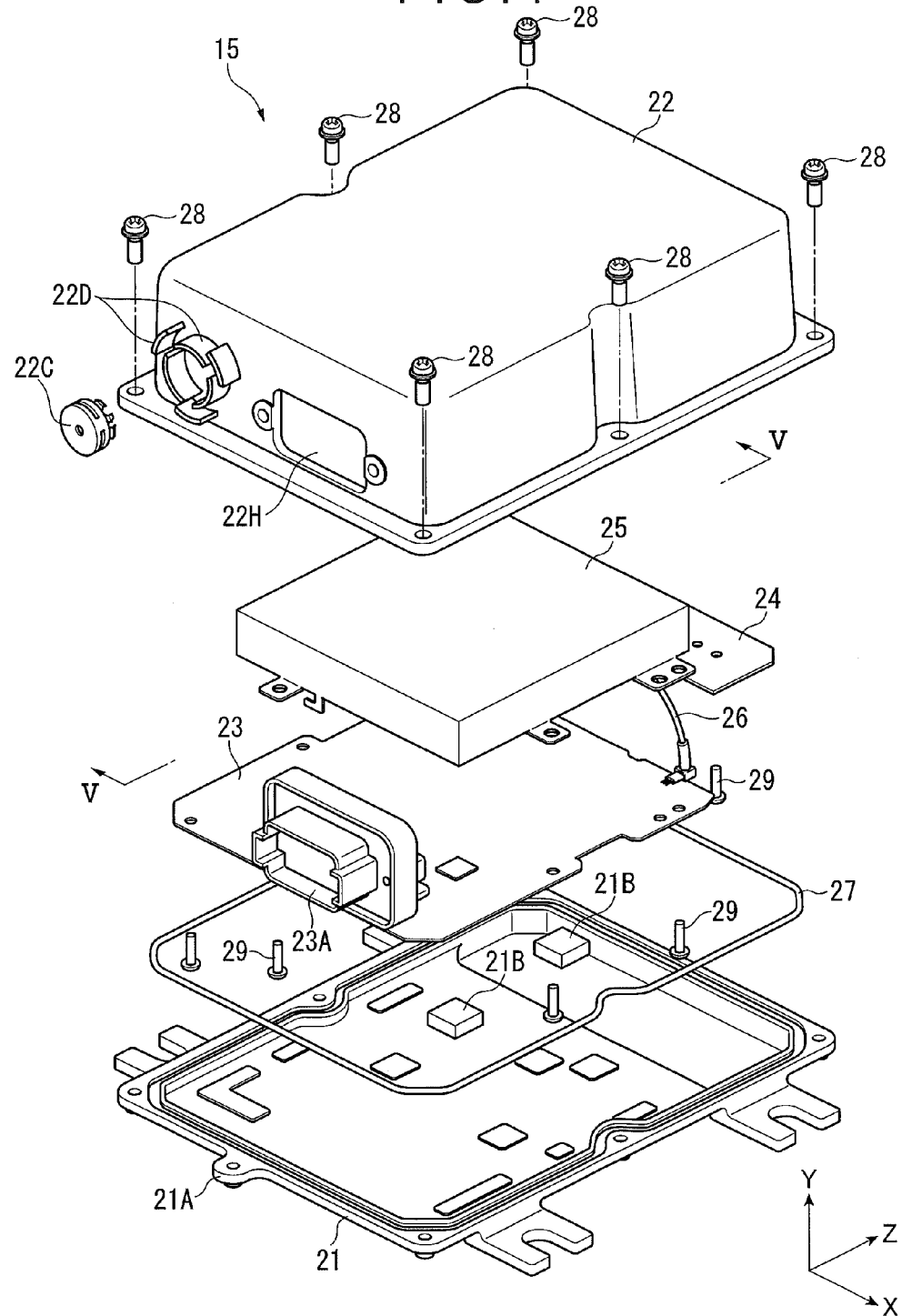
FIG. 4 is an exploded perspective view of the communication device.
Figure 5:
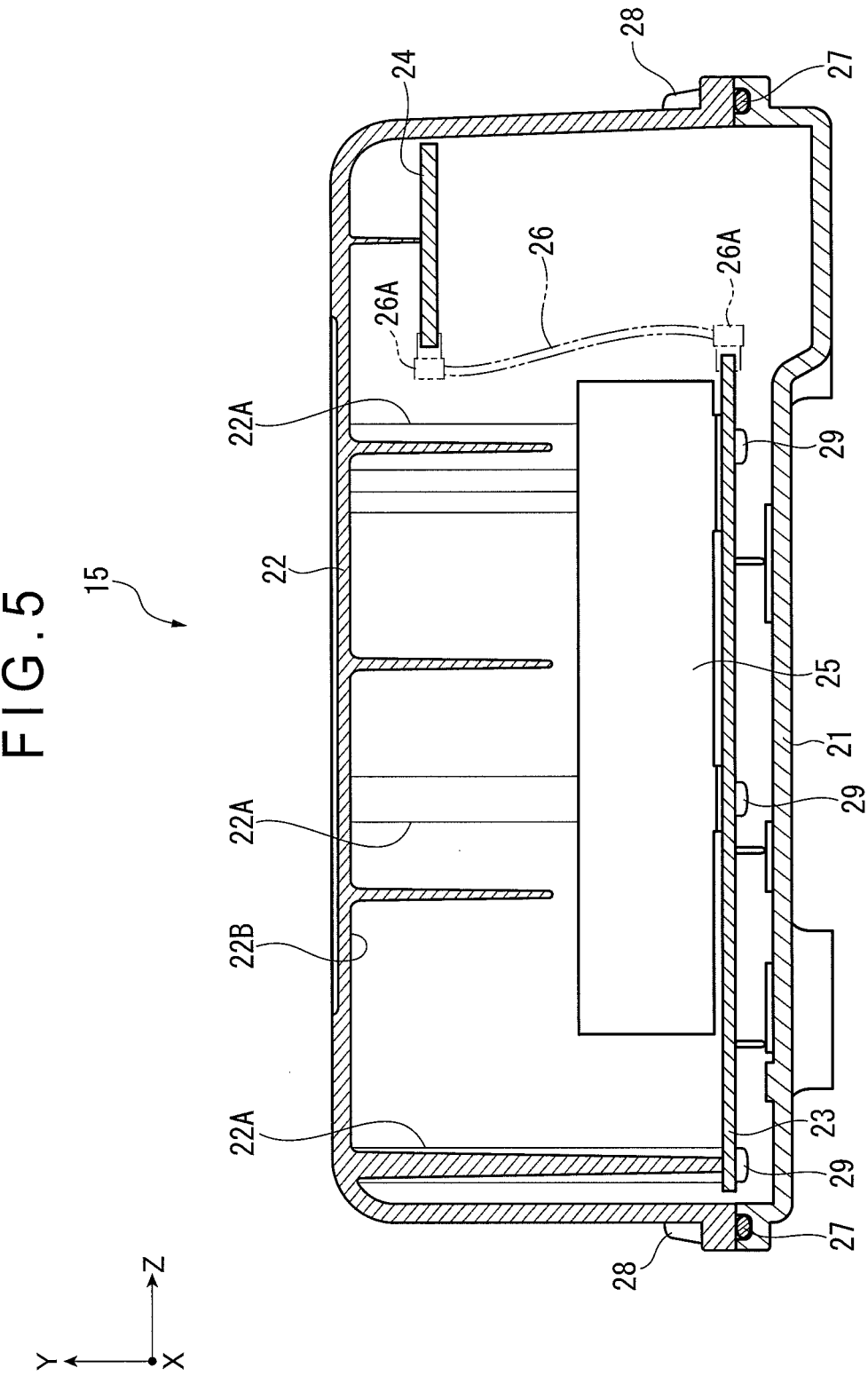
FIG. 5 is a cross-sectional view showing an assembled communication device and taken along a V-V line in FIG. 4.

FIG. 4 is an exploded perspective view showing the reader writer 15 (communication device). FIG. 5 is a cross-sectional view showing an assembled reader writer 15 (communication device) and taken along a V-V line in FIG. 4. In FIG. 5, a connector 23A, aperture 22H, breather 22C, and breather protection member 22D are not shown. An exterior of the reader writer 15 is provided by a metallic base plate 21 made by aluminum die-casting or the like and a resin-made cover 22 in a form of a box having a predetermined Y-directional depth as shown in FIG. 4. In an internal space defined by the base plate 21 and the cover 22, a CPU board 23 (a control board), an antenna (hereinafter, occasionally referred to as an antenna substrate) 24 that is spaced from the CPU board 23 in the Y direction as shown in FIGS. 4 and 5 and transmits the output obtained from a later-described wireless control circuit 35 in the form of radio waves, and a metallic shield member 25 that covers a component-installed surface of electronic components and the like (hereinafter, referred to as an element) on the CPU board 23 are housed. The CPU board 23 and the antenna 24 are electrically connected to each other through a connection cable 26. The antenna 24 is provided by forming a pattern of an antenna on the board and connecting the connector 26A to the antenna. The reader writer 15 is disposed in both of the engine room 5A2 and the pump room 5A1 (see FIG. 2) such that the connector (receptacle) 23A attached to the CPU board 23 faces downward. The connector 23A is exposed through the aperture 22H on the cover 22. A connector to which a communication cable for the in-vehicle network 210, a power cable from the battery, and the like are connected is fitted into the connector 23A.

The base plate 21 and the cover 22 are connected to each other with screws 28 while an annular sealing material 27 is interposed between the base plate 21 and the cover 22. The base plate 21 is provided with a ground member 21A that is grounded to a metallic frame of the vehicle body 2 via a screw (not shown) or the like. The base plate 21 and a ground line of the CPU board 23 are electrically connected to each other via an elastic conductive member (not shown) attached to the CPU board 23. The appropriate number of a heat radiation sheet 21B is adhered to an appropriate position on the base plate 21. When the CPU board 23 is disposed in contact with the heat radiation sheet 21B, heat generated on the CPU board 23 is transmitted to the base plate 21 to radiate.

Any material is usable for the cover 22 as long as the material is a resin employed for a casing of a typical electronic device. In the exemplary embodiment in which the reader writer 15 is used in severe temperature environments, a resin including glass fiber is used to improve resistance to environments. The aperture 22H is provided in a part of the cover 22 where the connector 23A is disposed. The cover 22 further includes the breather 22C and the breather protection member 22D which are flush with the aperture 22H. The breather 22C equalizes atmospheric pressures inside/outside the reader writer 15 to prevent condensation inside the reader writer 15. The breather protection member 22D aims at protecting the breather 22C from damage which may be caused when the reader writer 15 is attached to the hydraulic excavator 1.

The base plate 21 is metallic and the cover 22 is resin-made because radio waves are transmitted/received through the cover 22. The radio waves transmitted from the antenna 24 toward the base plate 21 are reflected by the base plate 21, thereby being transmitted from the cover 22 opposite to the base plate 21. By thus orienting the radio waves for transmission and reception, the radio waves having a requisite intensity can reliably reach the IC tag 30 of each of the filters 20 disposed in the target. The reader writer 15 can also receive the radio waves from each of the IC tags 30 with a high sensitivity.

A plurality of mounting bosses 22A for screw-fixing the CPU board 23 and the antenna 24 are provided on an inner side of the cover 22. The CPU board 23 is brought into contact with the mounting bosses 22A extending from an inner bottom 22B of the cover 22 toward the base plate 21. The CPU board 23 and the shield member 25 are fixed to the cover 22 by screws 29. FIG. 5 only shows the mounting bosses 22A for the CPU board 23. However, the antenna 24 is also brought into contact with a similar mounting boss 22A and is fixed to the cover 22 by the screws 29. The CPU board 23 and the antenna 24 are spaced from each other along the Y direction as shown in FIGS. 4 and 5. The CPU board 23 is positioned near the base plate 21. The antenna 24 is spaced from the base plate 21 in the Y direction as shown in FIGS. 4 and 5.

The CPU board 23 and the antenna 24 are provided by separate bodies. However, the CPU board 23 and the antenna 24 can be integrated as the same board. However, in such a case, in order to sufficiently output the radio waves, it is necessary to space an antenna part in an in-plane direction (X direction or Z direction shown in FIGS. 4 and 5) from a CPU board part on which radio-wave-transmission circuit and the like are formed. In this arrangement, an area of the used board becomes large, whereby a project area of the reader writer becomes large, so that the reader writer becomes large-sized. Accordingly, by spacing the CPU board 23 from the antenna 24 in a direction (Y direction) perpendicular to the in-plane direction, the project area is decreased to achieve down-sizing of the reader writer 15.

It is occasionally required to adjust or modify the designed size and the like of the antenna 24 after checking the transmission status of the radio waves and the like. In such a case, the arrangement in which the CPU board 23 and the antenna 24 are integrated requires re-design or re-production of the whole integrated board for the adjustment and the like. However, in the arrangement according to the exemplary embodiment in which the CPU board 23 and the antenna 24 are separated, re-production or replacement of the antenna 24 is only required, which is advantageous in term's of costs and handling procedure in the adjustment and the design modification.

As described above, since the CPU board 23 and the antenna 24 are spaced, the radio waves having a requisite intensity can be transmitted to the IC tag 30.

The shield member 25 functions as shielding incoming noise such that the elements installed on the CPU board 23 can stably operate without being affected by noise such as jamming radio waves from the surroundings of the CPU board 23. The shield member 25 is shaped like a box manufactured by processing a thin steel plate by sheet metal working and is attached over the elements installed on the CPU board 23. The connection cable 26 is provided by coaxial cables for high frequency waves and is connected to the CPU board 23 and a board of the antenna 24 via a connector 26A (FIG. 5). The connection cable 26 includes a core and a shield wire surrounding the core.

Arrangement of CPU Board

Figure 6:
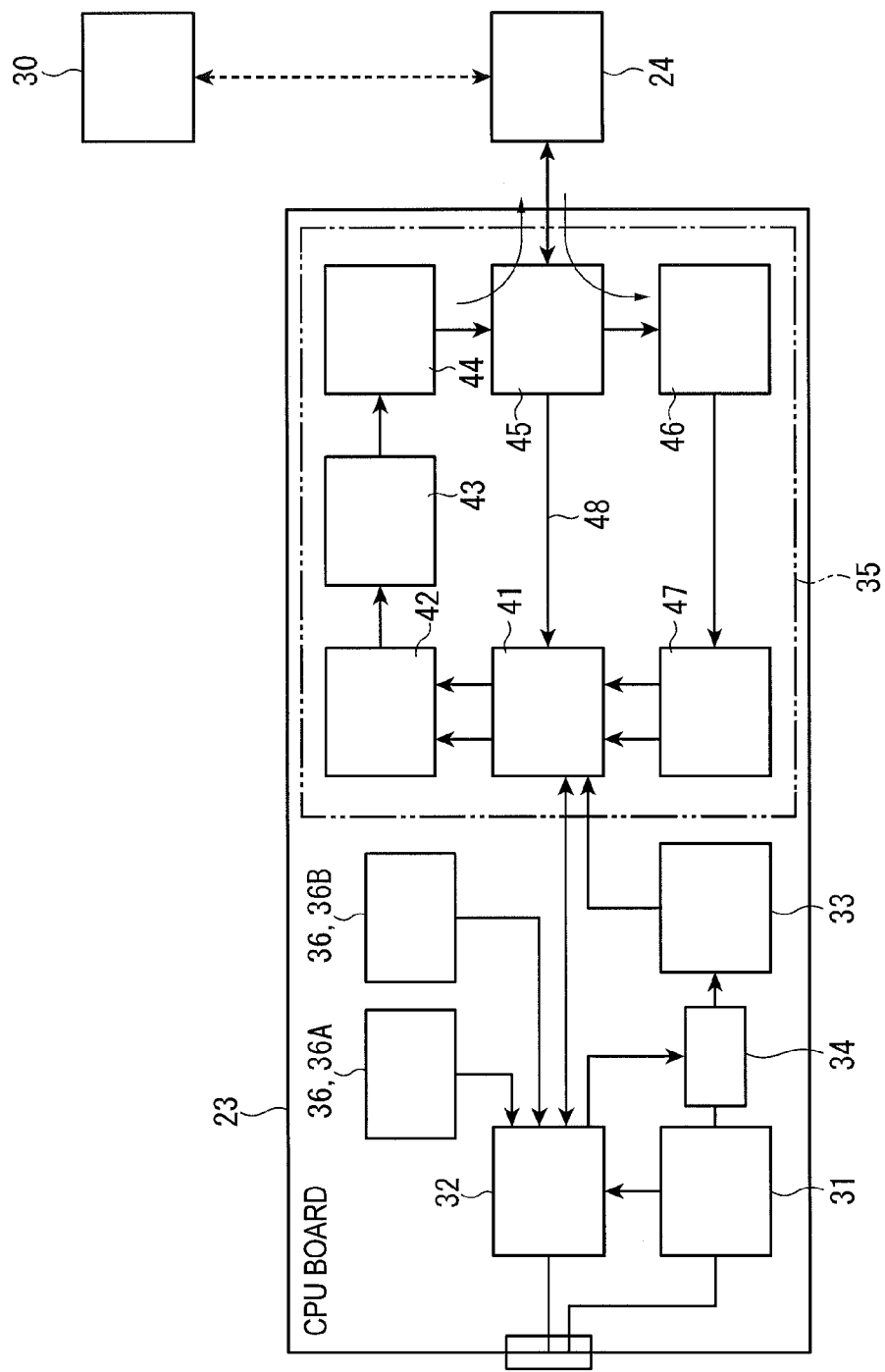
FIG. 6 is a circuit block diagram of a CPU board used in the communication device.

FIG. 6 shows a circuit block of the CPU board 23.

On the CPU board 23, a main power supply 31, CPU 32 (communication controller), wireless power supply 33, wireless power supply controller 34, wireless control circuit 35, and a plurality of temperature sensors 36 (36A, 36B) (temperature detector) are provided.

The main power supply 31 generates and supplies power for the CPU 32 and power for the wireless power supply 33 based on external power supplied via the connector 23A.

The CPU 32 controls the overall operations of the reader writer 15, including transmitting a command input through the in-vehicle network 210 to an RFID (Radio Frequency Identification) chip 41 of the wireless control circuit 35 as a command signal (command), and transmitting the command signal from the RFID chip 41 to the in-vehicle network 210.

The wireless power supply 33 provides a plurality of power supplies required by the wireless control circuit 35 based on the power supplied from the main power supply 31. One of the power supplies is for driving the RFID chip 41. Another one of the power supplies is for driving another circuit in the RFID chip 41. A still another one of the power supplies is for driving a power amplifier 44 (described below) of the wireless control circuit 35.

The wireless power supply controller 34 operates in response to the command signal from the CPU 32 to enable the power to be supplied from the main power supply 31 to the wireless power supply 33 or to be interrupted. As described later in the modification, the wireless power supply controller 34 may not only interrupt the power but also decrease the magnitude of the power to be supplied.

The wireless control circuit 35 is formed as a high frequency circuit including elements such as the RFID chip 41, a balancer 42 that performs impedance matching of a data transmission line on the transmitting side, a filter circuit 43 such as a band pass filter which eliminates output out of the required frequency band, a power amplifier 44 that amplifies the output from the RFID chip 41, a coupler (directional coupler) 45 that controls transmission to the antenna 24 and the reception from the antenna without decrease in power, a filter circuit 46 that eliminates an extra input such as noise in the frequency band, and a balancer 47 that performs impedance matching of a data transmission line on the receiving side. The data transmission line for transmitting the identification information to the IC tag 30 corresponds to a line running through the RFID chip 41, balancer 42, filter circuit 43, power amplifier 44, coupler 45, and further connection cable 26 to reach the antenna 24. On the other hand, the data transmission line for receiving the identification information from the IC tag corresponds to a line running through a part of the connection cable 26, which is connected to the antenna 24, coupler 45, filter 46 and balancer 47 to reach the RFID chip 41. In other words, the filter circuit 46 and the balancer 47 are used when receiving the identification information from the IC tag 30.

The temperature sensor 36 includes a thermister and the like and detects a temperature around the CPU board 23, namely, a temperature of the environments in which the elements are located. Specifically, the temperature sensor 36 is installed on the board near the CPU 32 in a manner capable of detecting the temperature near the surface on which the CPU board 23 is installed.

Among the elements forming the wireless control circuit 35, the RFID chip 41 outputs and transmits the radio waves in order to control reading the identification information from the IC tag 30 or writing the information to the IC tag 30 based on the command signal from the CPU 32.

The RFID chip 41 monitors its own output returning from the coupler 45 through the feedback line 48, thereby functioning to ensure the output at an appropriate magnitude.

In the exemplary embodiment including two reader writers 15A and 15B, when setting positions of the reader writers 15A and 15B are determined so that each of the reader writers 15A and 15B can read the same identification information of the IC tag 30, the respective RFID chips 41 of the reader writers 15A and 15B communicate with the IC tag 30. In the reading operation, the same identification information of the IC tag 30 is read by different RFID chips 41 and is eventually transmitted to the control server 101. With this arrangement, even when one of the reader writers 15 malfunctions due to disconnection or an unstable temperature condition as described later, the other of the reader writers 15 can read the identification information of the IC tag 30 and transmit the read identification information to the control server 101.

Since the CPU board 23 described above is separated from the antenna 24, the CPU board 23 and the antenna 24 are electrically connected via the connection cable 26. A state where the connection cable 26 is unplugged from the connector 26A and a state where the connection cable 26 is broken for some reasons such as vibration are defined as a disconnection state or simply disconnection. In a non-conduction state, when the RFID chip 41 is powered to transmit the radio waves to transmit, the output radio waves are totally reflected at the connection cable 26 disconnected from the connector 26A or a broken part of the connection cable 26, which may cause damage to the elements in the circuit of the CPU board 23 to output unstable radio waves.

The hydraulic excavator 1 occasionally works in a cold area where it becomes severely cold or an area where it becomes severely hot. Further, since the reader writer 15 is set near the engine EG, the hydraulic pump 12 and the like which are heat sources, the reader writer 15 needs to be operated at severe temperatures. The elements forming the reader writer 15 are usable within a predetermined temperature range. Accordingly, when used out of the predetermined temperature range, it is expected that a stable operation of the device cannot be ensured. The usable temperature range of the elements is defined by a temperature range in which the elements are not damaged in non-operation and a temperature range (operation-securable temperature range) in which the device is securely operable without being damaged in operation. In the exemplary embodiment, the usable temperature range is set by slightly narrowing the operation-securable temperature range for allowance. The power is interrupted according to the temperature detection (see FIG. 10). In the exemplary embodiment, the usable temperature range is set based on the RFID chip 41 which is an element having the narrowest operation-securable temperature range (i.e., the upper limit at high temperatures is low while the upper limit at low temperatures is high) among those of the elements forming the wireless control circuit 35. A temperature range in which the elements for wireless communication are expected to be stably operated is predetermined. Accordingly, when the elements are used in temperature environments out of the temperature range, the output of the radio waves possibly become unstable.

For this reason, the CPU 32 in the exemplary embodiment monitors a connection state of the connection cable 26 and a broken state of the connection cable 26. The CPU 32 is provided with various means for avoiding an unstable output of the radio waves when the above-defined disconnection occurs. Moreover, the CPU 32 is also provided with various means for avoiding an unstable output of the radio waves when the temperature of the surface on which the CPU board 23 is installed falls out of the predetermined range.

Arrangement of CPU

An overall arrangement of the CPU 32 will be described below.

Figure 7:
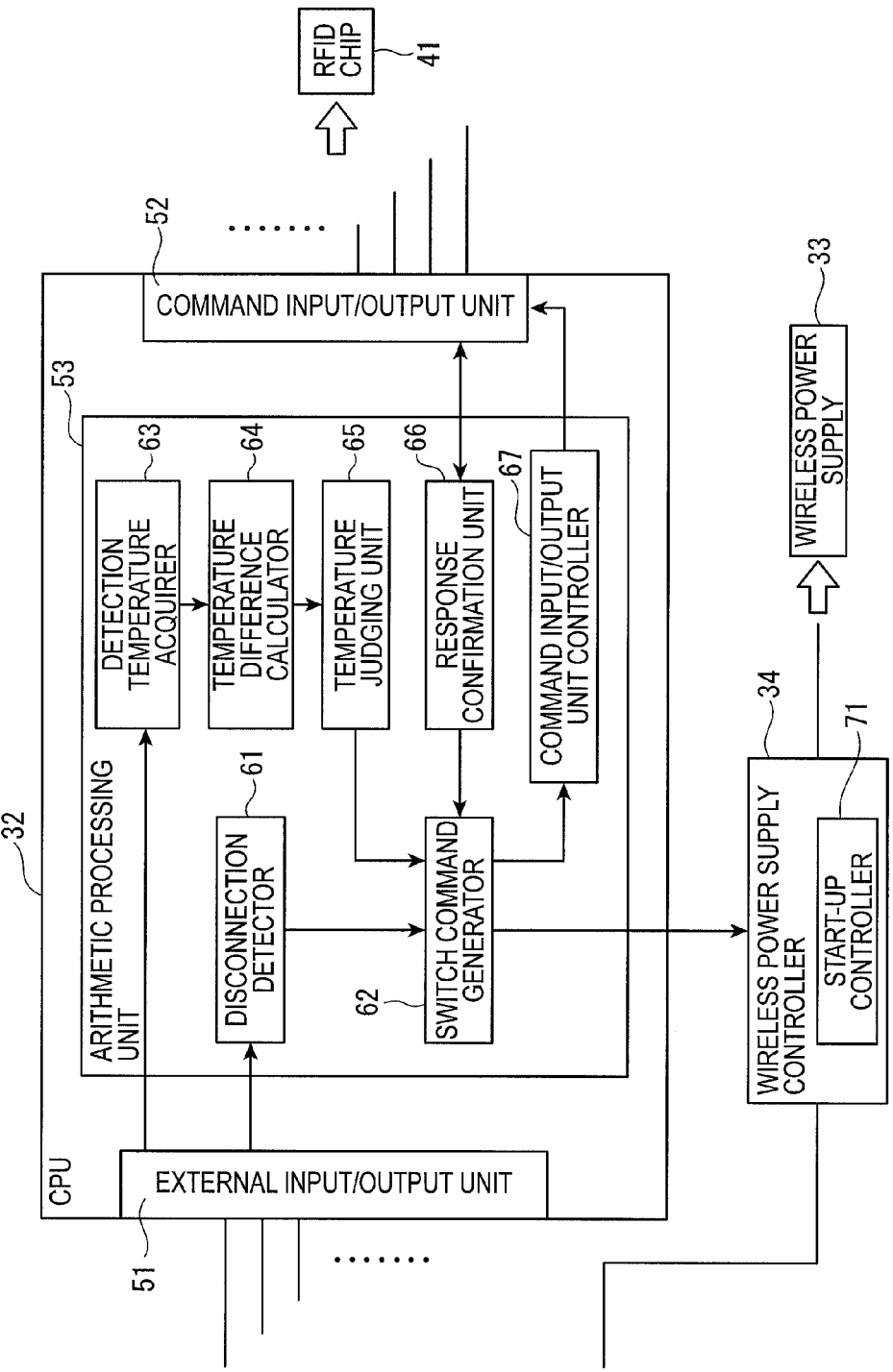
FIG. 7 is a control block diagram of the communication device.

In FIG. 7, the CPU 32 includes an external input/output unit 51, command input/output unit 52, and arithmetic processing unit 53. Further, the arithmetic processing unit 53 includes a disconnection detector 61, switch command generator 62, detection temperature acquirer 63, temperature difference calculator 64, temperature judging unit 65, response confirmation unit 66, and command input/output unit controller 67. The switch command generator 62 and the wireless power supply controller 34 form a transmission controller.

The external input/output unit 51 inputs/outputs the command signal and the information transmitted or received via the in-vehicle network 210, inputs the detection signal from the temperature sensor 36, inputs the power, and reads software from a storage (not shown) to instruct the CPU 32 to function as the components 61 to 67.

The command input/output unit 52 inputs/outputs the command signal from/to the RFID chip 41.

The arithmetic processing unit 53 executes not only the process of controlling the entire reader writer 15 but also the process by each of the components 61 to 67.

When the CPU 32 is activated, the disconnection detector 61 of the arithmetic processing unit 53 detects disconnection from the data transmission line between the CPU board 23 and the antenna 24, for instance, breakage of the connection cable 26 and an unplugged state of the connection cable 26 from the connector 26A. For specifically detecting the disconnection, a disconnection-detecting circuit shown in FIG. 11 is exemplarily used.

Figure 11:
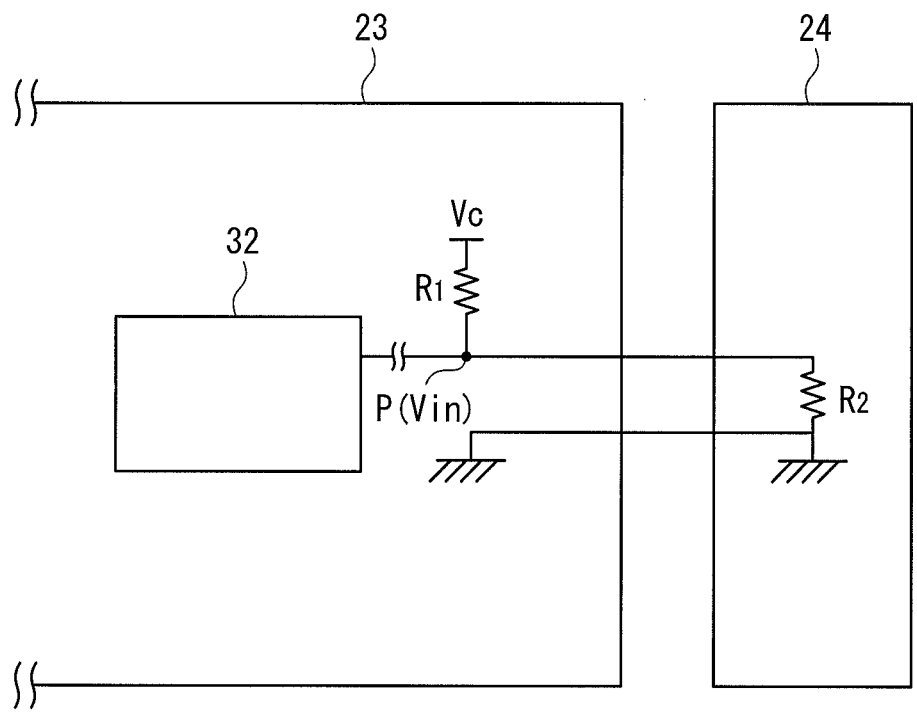
FIG. 11 illustrates a disconnection detection circuit.

In the disconnection-detecting circuit shown in FIG. 11, a pull-up resistor R1 having a predetermined resistance value is provided in the data transmission line on the CPU board 23 while a pull-down resistor R having the same resistance value as that of the pull-up resistor R1 is provided between the data transmission line and a ground line on the antenna 24. The CPU 32 monitors a voltage Vin at a point P on the data transmission line. The disconnection is detectable from a difference between an output voltage Vin at the point P in a normal conduction via the connection cable 26 and a voltage Vin at the disconnection. In the normal conduction, the voltage calculated by a calculation formula of Vin=(R2/(R1+R2))×Vc is applied on the point P. Herein, Vc represents a voltage applied on the pull-up resistor R1 and having a predetermined magnitude. However, when at least one of the core and the shield wire of the connection cable 26 provided by coaxial cables is broken, or the connection cable 26 becomes unplugged from the connector 26A, R2 in the above formula becomes infinite and a value obtained by dividing R2 by a sum of R1 and R2, in short, (R2/(R1+R2)) becomes approximately 1. Accordingly, at the disconnection, Vin=1×Vc, in short, Vin=Vc is satisfied according to the above formula. When this relation is satisfied, CPU 32 judges that the connection cable 26 is disconnected.

When the disconnection detector 61 judges that the CPU board 23 and the antenna 24 are disconnected, the switch command generator 62 transmits a command signal (OFF signal) of interrupting the supply of the power to the wireless power supply controller 34. When the disconnection detector 61 judges that the CPU board 23 and the antenna 24 are in a normal connection, the switch command generator 62 transmits a command signal (ON signal) of permitting the supply of the power.

When the OFF signal is transmitted in the disconnection, the wireless power supply controller 34 forms an open state, thereby interrupting the supply of the power from the main power supply 31 to the wireless power supply 33. For this reason, the power is not supplied to the RFID chip 41, whereby the RFID chip 41 is kept not activated. Accordingly, the radio waves are not output from the RFID chip 41 toward the antenna 24, thereby preventing the elements from being damaged by the total reflection and preventing radio waves with an unexpected output from being transmitted. The interruption of the power because of the disconnection is maintained at least until the CPU 32 is powered again.

The detection temperature acquirer 63 acquires detection temperatures obtained from both the temperature sensors 36A and 36B every specific period of time, and repeats such an acquisition for a predetermined number of times (N times). The detection temperature acquirer 63 further repeats N-time-acquisition for a specified period of time.

The temperature difference calculator 64 calculates a moving average of the detection temperatures for N times acquired by the detection temperature acquirer 63 to obtain a moving average temperature at every specific period of time of each of the temperature sensors 36A and 36B. Moreover, after the elapse of the specific period of time, the temperature difference calculator 64 calculates a temperature difference between the moving average temperature of the temperature sensor 36A and the moving average temperature of the temperature sensor 36B which are obtained at the last specific period of time.

The temperature judging unit 65 judges whether or not the elements installed on the CPU board 23 are in the environment within the usable temperature range based on the temperatures detected by the temperature sensors 36A and 36B. Moreover, the temperature judging unit 65 judges whether or not the temperature difference calculated by the temperature difference calculator 64 falls within a predetermined range based on the temperatures detected by the temperature sensors 36A and 36B. A control limit value (i.e., an upper limit value and a lower limit value) is set in the detection temperature. The temperature judging unit 65 monitors whether or not at least one of the moving average temperatures falls within the usable temperature range, in other words, falls out of the control limit value. The temperature judging unit 65 judges one of the temperature sensors 36A and 36B as being recognized in an unstable state, when the temperature difference between the moving average temperatures of the temperature sensors 36A and 36B detected by the temperature difference calculator 64 falls out of the predetermined range. Moreover, the temperature judging unit 65 judges the temperature of the CPU board 23 near the installed surface as being unexpectedly higher or lower, when at least one of the detected moving average temperatures is out of the control limit value. A process of such a temperature detection will be described later in detail.

Herein, also when the temperature judging unit 65 judges that one of the temperature sensors 36A and 36B is recognized in an unstable state, and that the temperature of the CPU board 23 near the installed surface is unexpectedly higher or lower, the aforementioned switch command generator 62 transmits the command signal (OFF signal) of interrupting the supply of the power to the wireless power supply controller 34, thereby interrupting the supply of the power from the main power supply 31 to the wireless power supply 33.

As described above, similar to the antenna 24 at the disconnection, when an unstable state is generated in one of the temperature sensors 36A and 36B, or when the detection temperature of one of the temperature sensors 36A and 36B falls out of the usable temperature range, the power is not supplied to the RFID chip 41, whereby the RFID chip 41 is kept undrivable. Accordingly, it is possible to prevent the elements from being used in a state where the temperature is not correctly detected and a state where the temperature falls out of the usable temperature range, so that it is possible to prevent the radio waves with an unexpected output from being transmitted. Moreover, it is possible to prevent failure from generating in the elements. The interruption of the power because of the temperature is cancelled when the temperature judging unit 65 judges that the temperature sensor(s) judged as being recognized in an unstable state is returned to a stable state, or when the detected temperature is returned to fall within the usable temperature range. In other words, the switch command generator 62 transmits the ON signal, whereby the power is supplied from the wireless power supply 33 to the RFID chip 41.

Such an interruption of the supply of the power to the wireless power supply 33 based on the detection temperature provides the following advantages. For instance, when the temperature exceeds the upper limit value of the usable temperature range, the performance of the power amplifier 44 is deteriorated. Though the RFID chip 41 is likely to transmit radio waves in an unpermitted frequency band n order to compensate for such deterioration, such a transmission is preventable. Moreover, when the temperature exceeds the upper limit value of the usable temperature range, it is possible that an adhesive and the like to be used is softened to cause a structural failure of the filter circuits 43 and 46.

Further, when the temperature exceeds one of the upper limit value and the lower limit value of the usable temperature range, the filter circuits 43 and 46 may filter an unintended frequency band.

The response confirmation unit 66 monitors the command signal transmitted from the RFID chip 41 in response to the command signal that the CPU 32 transmits to RFID chip 41. When the response confirmation unit 66 judges that a response command signal is not transmitted from the RFID chip 41, assuming that some failure occurs, the switch command generator 62 transmits the command signal (OFF signal) of interrupting the supply of the power to the wireless power supply controller 34, thereby interrupting the supply of the power from the main power supply 31 to the wireless power supply 33. In other words, since a stable operation cannot be ensured when a causeless failure occurs, the supply of the power is interrupted.

While the supply of the power to the wireless power supply 33 is interrupted by the wireless power supply controller 34, the command input/output unit controller 67 functions for setting a communication port between the CPU 32 and the RFID chip 41, namely, a communication port of the command input/output unit 52 at a LOW level (e.g., about 0 V of the voltage).

Since the supply of the power from the main power supply 31 to the wireless power supply 33 is interrupted, the power is not supplied to the RFID chip 41, whereby the RFID chip 41 is not activated. However, since the CPU 32 is activated, a predetermined voltage is applied on the communication port between the CPU 32 and the wireless control circuit 35, namely, on the command input/output unit 52. In such a state, sneak current may occur from the CPU 32 toward the RFID chip 41 since the CPU 32 and the RFID chip 41 are physically connected by the transmission line. The electric current is charged in a capacitor or the like in the RFID chip 41. Depending on conditions, the electric current may be used for power for the power amplifier 44 and the like, thereby transmitting unexpected radio waves with a predetermined output toward the outside.

In the exemplary embodiment, when the wireless power supply controller 34 interrupts the supply of the power to the wireless power supply 33, the command input/output unit controller 67 sets the voltage of the transmission line between the command input/output unit 52 and the RFID chip 41 at the LOW level (about 0 V of the voltage), thereby preventing the sneak current from the CPU 32 toward the RFID chip 41 from flowing into the RFID chip 41. Unlike the exemplary embodiment in which the aforementioned sneak current is prevented by using the CPU 32, the electric current may be prevented from flowing into the RFID chip 41 by electrical interruption of the transmission line between the command input/output unit 52 and the RFID chip 41. For instance, a relay is incorporated into the transmission line, and when the wireless power supply controller 34 interrupts the supply of the power to the wireless power supply 33, the relay is activated to interrupt the transmission line, whereby the electric current may be prevented from flowing into the RFID chip 41.

Arrangement of Wireless Power Supply Controller

Next, an exemplary function of the wireless power supply controller 34 will be described.

Figure 8:
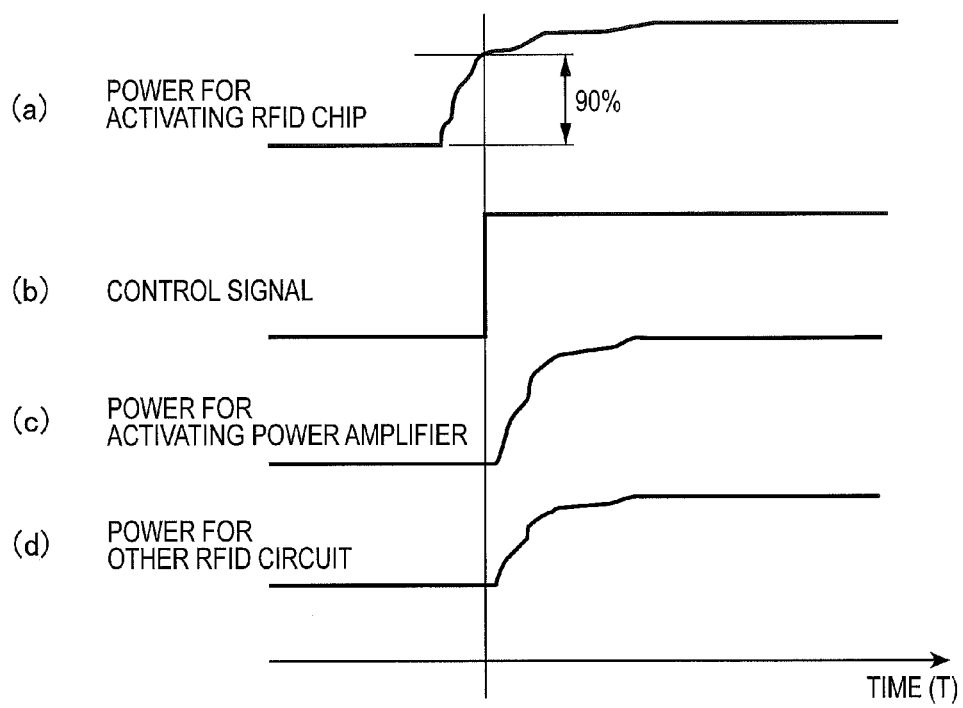
FIG. 8 illustrates a start-up control by the communication device.

FIG. 8 illustrates a start-up control of the communication device. An abscissa axis of FIG. 8 represents time (T) and an ordinate axis represents a fluctuation of the voltage of each of the power supply sources, or a change of the control signal. As shown in FIG. 7, the wireless power supply controller 34 includes a start-up controller 71. On receiving the ON signal from the CPU 32, the start-up controller 71 initially starts supplying the power to the wireless power supply 33 as shown in FIG. 8, thereby causing the wireless power supply 33 to generate power for driving the RFID chip 41 (FIG. 8(a)). After the voltage of the power to be supplied to the RFID chip 41 is increased to a certain percentage (90% in the exemplary embodiment), the start-up controller 71 transmits a control signal to the wireless power supply 33 (FIG. 8(b)). The wireless power supply 33 generates power for driving the power amplifier 44 and power for a circuit other than the RFID chip 41 (FIGS. 8(c), (d)).

Thus, among the elements of the wireless control circuit 35, the RFID chip 41, which is a main controller, is initially activated and the power is subsequently supplied to the peripheral elements and circuits to sequentially start, whereby the wireless control circuit 35 is stably operated.

Flow of Power Supply Interruption

Hereinafter, a flow of interrupting the power in response to the detection of the disconnection will be described with reference to the flow chart of FIG. 9. A flow of interrupting the power in response to the detection of the temperature will be described with reference to the flow chart of FIG. 10.

In FIG. 9, the main power supply 31 after receiving a driving factor signal (e.g., a key switch signal) supplies the power to the CPU 32 to activate. When the CPU 32 is activated, initially, the disconnection detector 61 of the CPU 32 acquires a voltage (Vin) for detecting the disconnection as shown in FIG. 11 and compares the acquired voltage (Vin) with a preset voltage (a voltage calculated according to the above formula) (STP1). As a result of the comparison, when the acquired voltage is coincident with the preset voltage, the disconnection detector 61 judges that the CPU board 23 and the antenna 24 are in a normal conduction (STP1, YES).

Next, the switch command generator 62 transmits the ON signal to the wireless power supply controller 34 (STP2).

Accordingly, the power is supplied from the main power supply 31 to the wireless power supply 33 and the power is supplied from the wireless power supply 33 to the RFID chip 41, whereby the wireless control circuit 35 including the RFID chip 41 is activated to make the reader writer 15 in a normal use condition.

On the other hand, when the acquired voltage (Vin) is not coincident with the preset voltage (the voltage calculated according to the above formula), in other words, when Vin is not equal to Vc, the disconnection detector 61 judges that the CPU board 23 and the antenna 24 are disconnected (STP1, NO).

At this time, the switch command generator 62 transmits the OFF signal to the wireless power supply controller 34 (STP3).

Accordingly, the power is not supplied from the main power supply 31 to the wireless power supply 33, so that the power for the RFID chip 41 and for any other component is not generated. Consequently, the output from the RFID chip 41 is not transmitted, thereby possibly preventing the elements from being damaged by the total reflection at a disconnection part and preventing unexpected radio waves from being transmitted.

Figure 12:
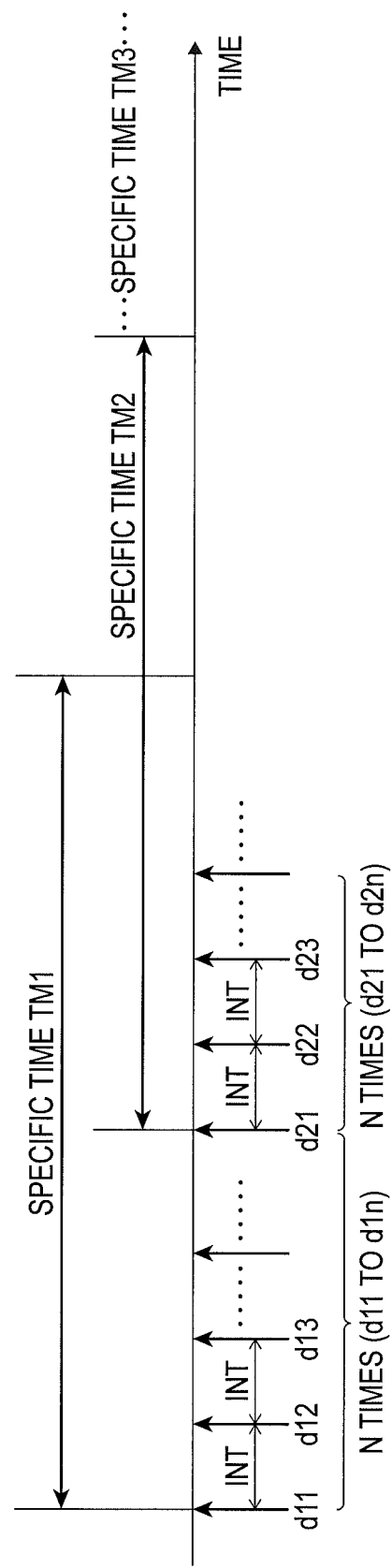
FIG. 12 illustrates a process of the temperature detection.

Next, a flow of interrupting the power in response to the temperature detection will be described with reference to FIGS. 10 and 12. In the reader writer 15 in a normal use condition, the detection temperature acquirer 63 of the CPU 32 acquires detection temperatures t1 and t2 obtained from the temperature sensors 36A and 36B every predetermined period of time INT (STP1), which is repeated for a predetermined number of times (N times). The detection temperature acquirer 63 further repeats N-time-acquisition for a specified period of time TM. N times refer to the preset number of the times.

When the temperature detection does not reach the predetermined N times, the temperature detection is repeated (STP2, NO). During this acquisition, the temperature difference calculator 64 acquires a plurality of groups of detection temperatures for N times, which is acquired by the detection temperature acquirer 63, during the specified period of time TM, thereby obtaining a moving average of the acquired detection temperatures to calculate moving average temperatures T1 and T2 of the respective temperature sensors 36A and 36B for each specified period of time (TM1, TM2, etc.). Moreover, the temperature difference calculator 64 calculates a temperature difference ΔT between the moving average temperature T1 of the temperature sensor 36A and the moving average temperature T2 of the temperature sensor 36B which are obtained at the last specific period of time (STP3).

The process in STP2 of FIG. 10 will be specifically described with reference to FIG. 12. The process described below is executed by the detection temperature acquirer 63, so that the moving average temperatures T1 and T2 are obtained. The temperature sensors 36A and 36B acquire the detection temperatures t1 and t2 every predetermined period of time INT. In the specified period of time TM1, the detection temperatures acquired at the first specified times N are defined as d1*l* to d1*n*. When the specific period of time TM1 is not elapsed, the detection temperatures (d2*l* to d2*n*) are acquired at the next specified times N. Groups (d1*l* to d1*n*, d1*l* to d2*n*, etc.) of the detection temperatures acquired the specified times N are respectively averaged to obtain average values (A1, A2, etc.). It is exemplarily assumed that four average values of A1 to A4 are obtainable for the specified period of time TM1. An average value of the four average values is obtained and defined as the moving average temperature T1 or T2. As shown in FIG. 12, the specified period of time TM starts to be counted every execution of the temperature detections for the specified times N, and the moving average temperature T1 or T2 is obtained in sequence. The temperature difference calculator 64 calculates the temperature difference ΔT between the moving average temperatures T1 and T2 in the last specified period of time TM. By thus obtaining the moving average temperatures, an accurate detection temperature with less influence of the noise and the like can be obtained even when the temperature sensor 36A or 36B momentarily detects an incorrect temperature due to the influence of the noise and the like. Based on the detection temperature, the interruption of the power can be executed.

Next, the temperature judging unit 65 judges whether or not the temperature difference ΔT calculated by the temperature difference calculator 64 falls within the predetermined range and whether or not the last moving average temperatures T1 and T2 fall within the preset control limit value (STP4). When the temperature difference ΔT falls out of the predetermined range or the moving average temperatures T1 and T2 fall out of the control limit value as operating hours of the hydraulic excavator 1 is increased in severe temperature environments (e.g., in severely hot or cold areas) (STP4, NO), the switch command generator 62 transmits the OFF signal to the wireless power supply controller 34 (STP5), thereby interrupting the supply of the power to the wireless power supply 33.

On the other hand, when it is judged in STP4 that the temperature difference ΔT falls within the predetermined range and the moving average temperatures T1 and T2 fall within the control limit value (STP4, YES), the temperature judging unit 65 checks the state of the wireless power supply controller 34 (STP6). When the supply of the power from the main power supply 31 to the wireless power supply 33 is completed by the transmission of the ON signal to the wireless power supply controller 34, the supply of the power is kept in the same state (STP6, YES). However, when the supply of the power from the main power supply 31 to the wireless power supply 33 is interrupted by transmission of the OFF signal to the wireless power supply controller 34 (STP6, NO), the switch command generator 62 transmits the ON signal to the wireless power supply controller 34 (STP7), thereby restarting the supply of the power to the wireless power supply 33.

By executing the aforementioned flow, the breakage of the elements and the like and transmission of the radio waves having an unexpected output can be prevented even when the disconnection and the detection temperature in an unstable state are recognized.

Modification(s)

The scope of the invention is not limited to the above-described embodiment but includes various variations and improvements as long as an object of the invention can be achieved.

For instance, though the supply of the power from the main power supply 31 to the wireless power supply 33 is interrupted when the connection cable 26 is judged as being disconnected, in the above exemplary embodiment, the output generated in the powered RFID chip 41 may be controlled not to be transmitted to the transmission line including the connection cable 26.

The invention is applicable not only to a construction machine in a form of a hydraulic excavator, but also to a working vehicle as a construction machine in a form of a wheel loader and a dump truck, and a working vehicle such as a forklift and an agricultural vehicle. In the above exemplary embodiment, the IC tag 30 is attached to a consumable component or a periodic replacement component in a form of the filter 20. However, the invention is applicable to the IC tag 30 attached to another consumable component or periodic replacement component (e.g., a hydraulic pressure hose equipped in a working vehicle) and a component corresponding to a repair component such as the engine EG and the transmission.

The invention claimed is:

1. A communication device mounted in a working vehicle and configured to execute at least one of reading identification information stored in an identification component attached to a component of the working vehicle and writing the identification information to the identification component, the communication device comprising:
   a control board comprising: a communication controller that is configured to control an execution of the at least one of reading and writing the identification information; a wireless control circuit that is configured to generate an output of radio waves in response to a command from the communication controller; and a wireless power supply that is configured to supply power to the wireless control circuit;
   an antenna that is spaced from the control board and configured to transmit the output of the radio waves obtained from the wireless control circuit based on the wireless control circuit being supplied with power; and
   a connection cable that is configured to electrically connect the control board to the antenna, wherein
   the control board comprises: a disconnection detector that is configured to detect a disconnection of the connection cable; a transmission controller that is configured to transmit the output of the radio waves from the wireless control circuit to the antenna based on the wireless control circuit being supplied with power and to interrupt a transmission of the output of the radio waves from the wireless control circuit to the antenna based on the disconnection detector determining that the connection cable is disconnected; and a wireless power supply controller that is configured, based on the disconnection detector determining that the connection cable is disconnected, to interrupt the supply of power to the wireless control circuit in response to a command signal from the transmission controller before the output of the radio waves is transmitted from the wireless control circuit to the antenna.

2. The communication device according to claim 1, wherein
the control board comprises: a main power supply, and
the transmission controller comprises: the wireless power supply controller; and a switch command generator that is configured to generate a switch command of interrupting the supply of the power from the main power supply to the wireless power supply and to transmit the switch command to the wireless power supply controller based on the disconnection detector determining that the connection cable is disconnected.

3. The communication device according to claim 2, wherein
the communication controller is connected to the wireless control circuit via a transmission line, is configured to control communication of the identification information with the wireless control circuit, and is configured to decrease a voltage level of the transmission line based on the disconnection detector determining that the connection cable is disconnected.

4. The communication device according to claim 2, wherein
the communication controller is connected to the wireless control circuit via a transmission line and is configured to control communication of the identification information with the wireless control circuit, and
the transmission line comprises a relay that is configured to electrically interrupt the transmission line based on the disconnection detector determining that the connection cable is disconnected.

5. The communication device according to claim 2, wherein
the communication controller is connected to the wireless control circuit via a transmission line, is configured to control communication of the identification information with the wireless control circuit, and suppress a sneak current from the communication controller to the wireless control circuit based on the disconnection detector determining that the connection cable is disconnected.

6. The communication device according to claim 1, wherein
the control board comprises a pull-up resistor connected to a transmission line between the control board and the antenna including the connection cable,
the antenna comprises a pull-down resistor that connects the transmission line to a ground line, and
the disconnection detector is configured to detect a voltage of the transmission line on the control board.

7. The communication device according to claim 1, wherein
the disconnection detector is configured to detect the disconnection based on the communication controller being activated by receiving power from a battery of the working vehicle.

8. The communication device according to claim 7, wherein
the power is supplied to the communication controller to actuate the communication controller based on an engine of the working vehicle being started upon an operation of a key switch, and the disconnection is detected by the disconnection detector.

9. The communication device according claim 1, wherein
the disconnection detector is configured to detect, as the disconnection, breakage of the connection cable or an unplugged state of the connection cable from a connector connected to the control board or the antenna.

10. A working vehicle comprising the communication device according to claim 1.

11. A communication device that is mounted in a working vehicle and executing at least one of reading identification information stored in an identification component attached to a component of the working vehicle and writing the identification information to the identification component, the communication device comprising:
a control board comprising: a communication controller that controls an execution of the at least one of reading and writing the identification information; and a wireless control circuit that generates an output of radio waves in response to a command from the communication controller;
an antenna that is spaced from the control board and transmits the output obtained from the wireless control circuit; and
a connection cable that electrically connects the control board to the antenna, wherein
the control board comprises: a disconnection detector that detects a disconnection of the connection cable; a transmission controller that interrupts the output from the wireless control circuit to the antenna when the disconnection detector judges that the connection cable is disconnected; a main power supply; a wireless power supply that generates power for the wireless control circuit from power supplied from the main power supply; a wireless power supply controller that switches between a supply and an interruption of the power from the main power supply to the wireless power supply; and a pull-up resistor connected to a transmission line between the control board and the antenna including the connection cable,
the transmission controller comprises: the wireless power supply controller; and a switch command generator that generates a switch command of interrupting the supply of the power from the main power supply to the wireless power supply and transmits the switch command to the wireless power supply controller, when the disconnection detector judges that the connection cable is disconnected,
the antenna comprises a pull-down resistor that connects the transmission line to a ground line, and
the disconnection detector detects a voltage of the transmission line on the control board.

12. A working vehicle comprising the communication device according to claim 11.

13. A communication device mounted in a working vehicle and executing at least one of reading identification information stored in an identification component attached to a component of the working vehicle and writing the identification information to the identification component, the communication device comprising:
a control board comprising: a communication controller that controls an execution of the at least one of reading and writing the identification information; and a wireless control circuit that generates output of radio waves in response to a command from the communication controller;

an antenna that is spaced from the control board and transmits the output obtained from the wireless control circuit; and a connection cable that electrically connects the control board to the antenna, wherein the control board comprises: a disconnection detector that detects a disconnection of the connection cable; a transmission controller that interrupts the output from the wireless control circuit to the antenna when the disconnection detector judges that the connection cable is disconnected; a main power supply; a wireless power supply that generates power for the wireless control circuit from power supplied by the main power supply; and a wireless power supply controller that switches between a supply and an interruption of the power from the main power supply to the wireless power supply, and the transmission controller comprises: the wireless power supply controller; and a switch command generator that generates a switch command of interrupting the supply of the power from the main power supply to the wireless power supply and transmits the switch command to the wireless power supply controller, when the disconnection detector judges that the connection cable is disconnected.

14. The communication device according to claim 13, wherein
the communication controller is connected to the wireless control circuit via a transmission line, controls communication of the identification information with the wireless control circuit, and decreases a voltage level of the transmission line when the disconnection detector judges that the connection cable is disconnected.

15. The communication device according to claim 13, wherein
the communication controller is connected to the wireless control circuit via a transmission line and controls communication of the identification information with the wireless control circuit, and
the transmission line comprises a relay that electrically interrupts the transmission line when the disconnection detector judges that the connection cable is disconnected.

16. The communication device according to claim 13, wherein
the control board comprises a pull-up resistor connected to a transmission line between the control board and the antenna including the connection cable,
the antenna comprises a pull-down resistor that connects the transmission line to a ground line, and
the disconnection detector detects a voltage of the transmission line on the control board.

17. The communication device according to claim 13, wherein
the disconnection detector detects the disconnection when the communication controller is activated by receiving power from a battery of the working vehicle.

18. The communication device according claim 13, wherein
the disconnection detector detects, as the disconnection, breakage of the connection cable or an unplugged state of the connection cable from a connector connected to the control board or the antenna.

19. A working vehicle comprising the communication device according to claim 13.

* * * * *